July 6, 1954

R. E. CLOSE 2,682,850

SEAM CLOSING MACHINE FOR TUBING

Filed Sept. 13, 1949

INVENTOR.
RUSSELL E. CLOSE
BY
ATTORNEYS

July 6, 1954     R. E. CLOSE     2,682,850
SEAM CLOSING MACHINE FOR TUBING
Filed Sept. 13, 1949     5 Sheets-Sheet 2

INVENTOR.
RUSSELL E. CLOSE
BY
ATTORNEYS

July 6, 1954  R. E. CLOSE  2,682,850
SEAM CLOSING MACHINE FOR TUBING
Filed Sept. 13, 1949  5 Sheets-Sheet 3

INVENTOR.
RUSSELL E. CLOSE
BY
*Clyr Frye*
ATTORNEYS

July 6, 1954 R. E. CLOSE 2,682,850
SEAM CLOSING MACHINE FOR TUBING
Filed Sept. 13, 1949 5 Sheets-Sheet 4

INVENTOR.
RUSSELL E. CLOSE
BY
ATTORNEYS

INVENTOR.
RUSSELL E. CLOSE
BY Clyt Frye
ATTORNEYS

Patented July 6, 1954

2,682,850

UNITED STATES PATENT OFFICE 2,682,850

SEAM CLOSING MACHINE FOR TUBING

Russell E. Close, Akron, Ohio

Application September 13, 1949, Serial No. 115,520

17 Claims. (Cl. 113—54)

This invention relates to a machine for automatically and continuously effecting jointure, and final closing and sealing of a tube seam known in the trade as the "Pittsburgh Lock." In its most widespread employment, this seam occurs at one corner of a rectangular conduit of sheet metal and comprises a female fold on one edge of the sheet metal into which a male portion, on the edge of an adjacent side, is introduced. Heretofore, the joining of such edges has been accomplished by hand methods (although the formation of the seam lock itself has been performed by completely automatic methods), the insertion of one seam element into the other being accomplished by hand and the turning of edges and hammering into a final seal also being done by hand. Such procedure is time-consuming and leaves much to be desired in the appearance and secureness of the final product.

It is, therefore, an object of the invention to provide a machine which will automatically effect jointure and final sealing of a prefabricated seam lock. In particular, it is an object to accomplish automatic jointure and final sealing of a seam at one corner of a rectangular tube, of the type known as the "Pittsburgh Lock," wherein an S-shaped fold on the terminal edge of one side receives a turned edge of the adjacent side, with an extension of the S turned in an outer fold about the said adjacent side.

Briefly, the invention comprises a cantilever arm journalling a series of rollers for coaction with rollers in the base of the machine, and with rollers located to one side of the machine, in sequential fashion along the extent of the arm, to operate on a tube which, in open fashion, is introduced around the standard supporting the cantilever arm.

The above-stated objects are attained by such a device, a preferred embodiment of which is described in detail in the accompanying specification and illustrated in the drawings, in which.

Figure 1:
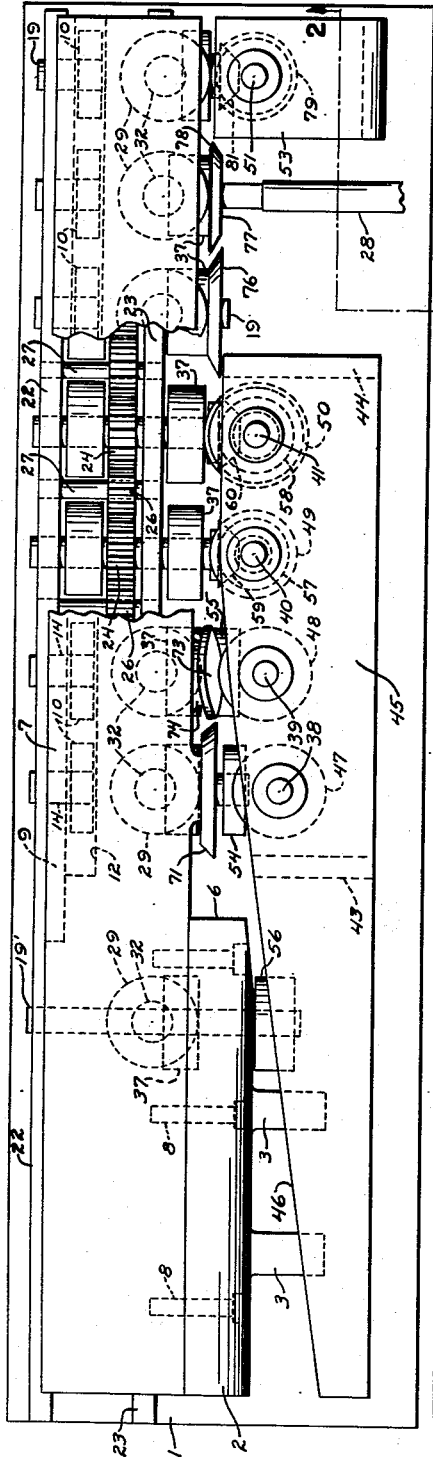
Fig. 1 is a top plan view of the machine.
Figure 2:
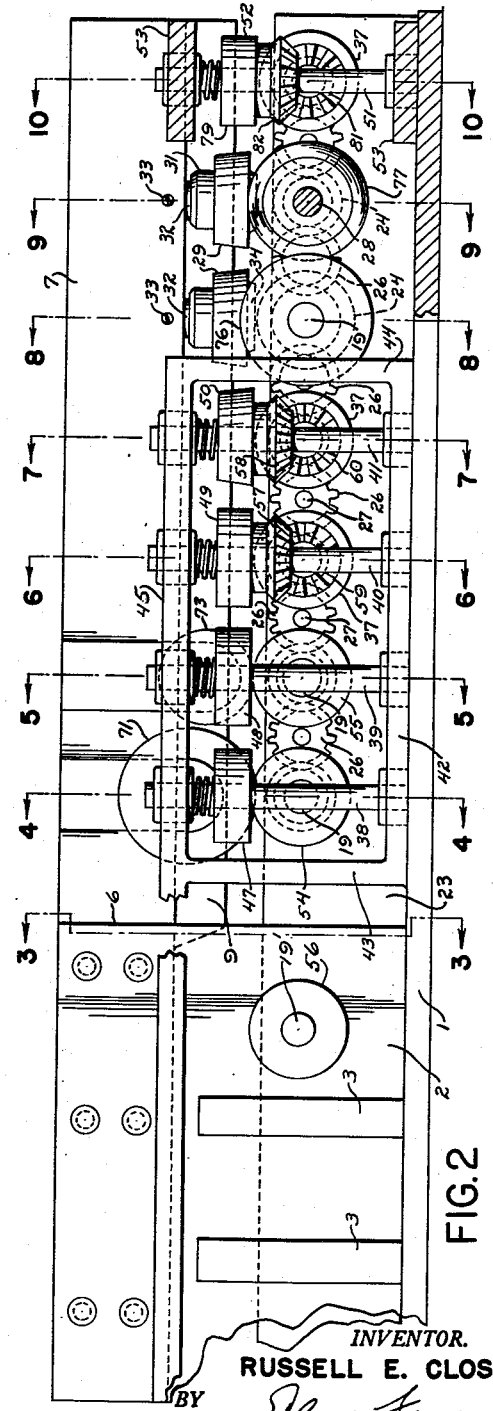
Fig. 2 is a side elevation of the machine shown in Fig. 1.

Referring to the drawings by characters of reference, there is shown a base 1 supporting the entire seam-closing mechanism. An upright plate 2 is secured to base 1, as by welding, and may have web reinforcements 3, 4. The plate 2, which terminates forwardly at 6 forms the anchorage for a cantilever arm 7, the latter being secured to the upright as by bolts 8. The outer face of arm 7 has a dependent plate section 9 serving to journal a set of idler, guide rollers 10, seven in number and identical in structure, mounting and function. Rollers 10, for which clearance is provided in a groove 12 in the underside of plate 7 are mounted, through conventional bearings 13 on a shaft 14 held in dependent portion 9 by set screws 16. The respective rollers 10 overlie a set of rollers 17 (Figs. 4 to 10) keyed, as by set screws 18, to a shaft 19 journaled in bearings 21 in parallel upright plates 22, 23 running lengthwise of the base 1. The respective pairs of rollers 10, 17 are in contact or nearly so, and receive the work between them so as to hold it in place as well as impart a drive. For the latter purpose, the shafts 19 have each a gear 24 keyed thereto, and unidirectional rotation of the rollers 17 is effected by intermediate gears 26 keyed to shafts 27 supported in uprights 22, 23. The power input (not shown) to the gears is supplied to an extension 28 on one of the shafts 19.

A series of identical idler rollers 29 are mounted through bearings 31 to stud shafts 32, held in the underside of arm 7 by set screws 33, and are inclined at a slight angle to the vertical. As shown, the rollers are located adjacent rollers 10 and 17, but this relationship is not necessary. The work is intended to pass under rollers 29 and the slight inclination of the rollers provides for point-peripheral contact so that the rollers will roll. Rollers 29 have a reduced, lower extension 34 with filleted periphery 36 to accommodate the female portion of the seam lock, as will appear. Underlying and slightly spaced from rollers 29, and laterally offset from the centers thereof, are rollers 37 journaled on shafts 19 and also on a shaft 19' mounted in the region of upright plate 2 and supported thereby, as well as by uprights 22 and 23.

A series of upright shafts 38, 39, 40, 41 are journaled, by means of anti-friction bearings, in a framework having a base 42 secured to base 1, uprights 43, 44 and an upper plate 45 slanted on its inner side, as at 46, to form a feeding guide for the work. The shafts carry rollers 47, 48, 49 and 50, respectively, contributing to the seam-closing operation in its early stages, as presently to be explained. Another shaft 51, carrying a roller 79 employed in the final sealing operation, is journaled by antifriction bearing in the upper and lower plates of a U-shaped frame 53 attached to base 1.

As seen in Fig. 1, shafts 38 and 39 are equidistant from slant side 46 of plate 45, and shafts 40 and 41 are equidistant from an unslanted edge of the same side of the plate. The undersides of rollers 47 and 48 make tangential contact with rollers 54, 55 carried on the adjacent shafts 19, and a roller 56 similar to rollers 54 and 55 is carried on shaft 19', outwardly of upright 2. Shafts 40 and 41 carry bevel gears 57, 58 meshing wtih bevel gears 59, 60 carried on the adjacent shafts 19 (see Figs. 6, and 7), so that drive is imparted to rollers 49, 50.

Various rollers carried either on the arm 7 or on the various shafts 19 will be described in connection with the various stages of seam closing.

Figure 3:
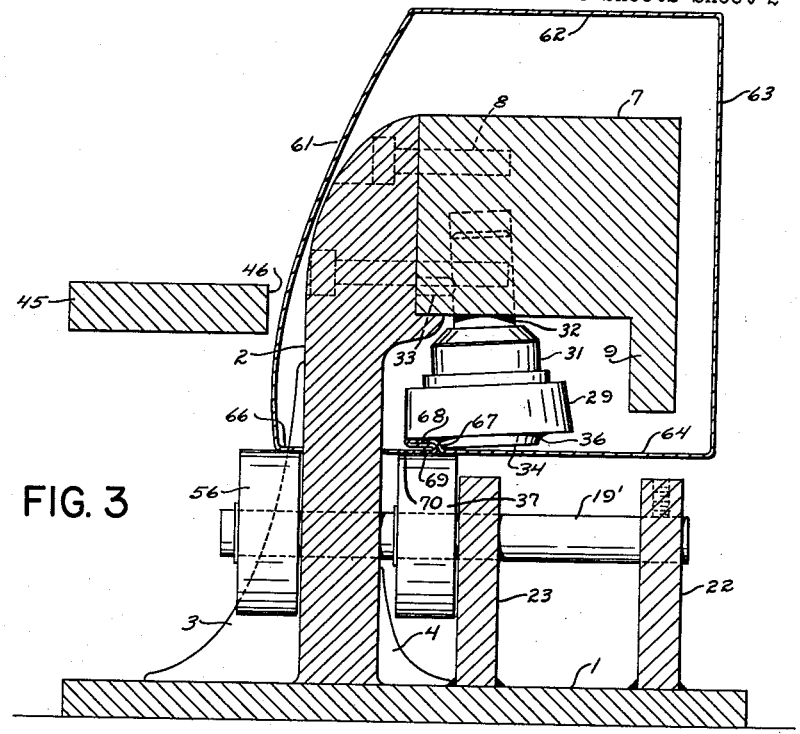
Figs. 3 to 10 are sectional views taken on the indicated lines in Fig. 2.
Figure 11:
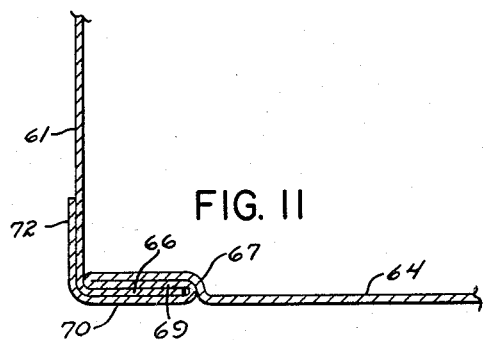
Fig. 11 is an enlarged view of a corner of rectangular tubing, in section, showing the "Pittsburgh Lock" in sealed relation.

As the tubing to be seamed emerges from the machine forming the "Pittsburgh Lock," it has the general appearance shown in Fig. 3, with four integral sides 61, 62, 63, 64. Side 61 has a rectangularly turned, inward flange 66 and side 64 is folded along its free edge, upwardly at 67, outwardly at 68, inwardly at 69 to contact the underside of portion 68, and finally, outwardly at 70 in spaced relation to the underside of fold 69 and extending therebeyond. In the final closure, flange 66 will lie between folds 69 and 70 and the extended part of portion 70 will be turned into contact with the outer surface of side 61, as clearly appears in Fig. 11. Heretofore, the flange 66 has been inserted by hand and the extended part of fold 70 hammered around the edge of side 61.

The work may be of any length or sectional area. In inserting it into the machine, the parts 66 and 70 are moved along opposite sides of upright plate 2 and, due to the curtailed length thereof, at 6, the parts 66 and 70 may be ultimately brought together in the regions beneath cantilever arm 7. In Fig. 3 the open seam is still astride upright 2 but is approaching the guiding, slant surface 46 of plate 45. At this stage the fillet 36 of the first roll 29 has contacted the female or S-shaped part of the seam and initiated guidance thereof, the free end of fold 70 abutting the inner wall of upright 2. Also the proper horizontal positioning of flange 66 is initiated by roller 56. Preferably the work is advanced manually from the position of Fig. 3 to that of Fig. 4 in order to ensure perfect alignment before the power drive takes over, but it will be understood that the drive could be initiated at the first stage if such were desired.

Figure 4:
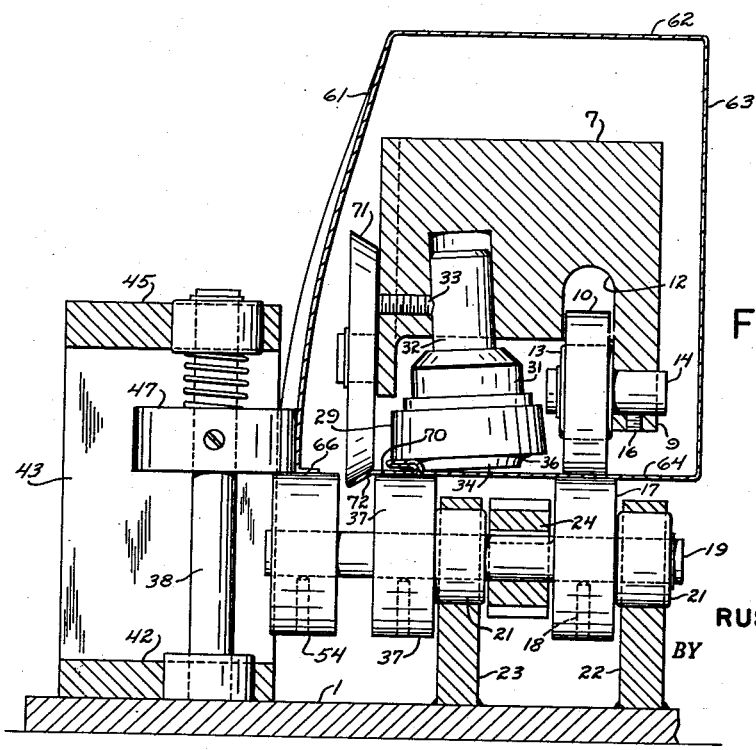

In Fig. 4, the side 61 has been carried toward the bottom 64 by camming action of slant side 46 of guide member 45 and still further by roller 47, flange 66 being maintained horizontal by roller 54. At this stage, a beveled roller 71, carried on arm 7, turns the free edge of fold 70 downward, as at 72, to afford unobstructed entry of flange 66 into the female part. At this stage, advancement of the work is taken over by rollers 37 and 17, the work being lodged between these and upper rollers 29 and 10 by the natural spring in the arm 7. Like pairs of rollers continue the drive at each succeeding stage in the machine.

Figure 5:
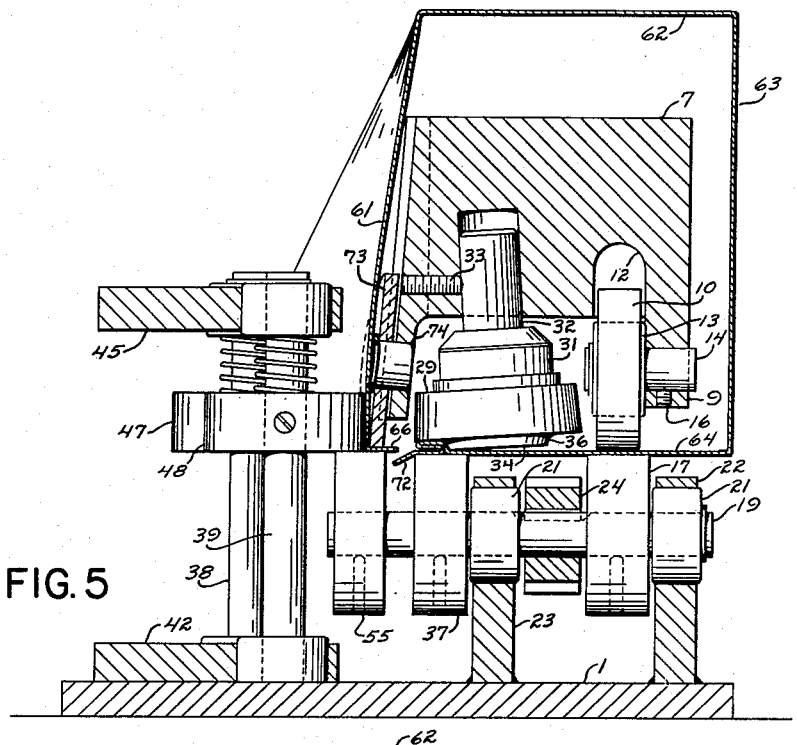

At the stage shown in Fig. 5, not only is the side 61 carried further inwardly by roller 48, but a roller 73 engages the inside of flange 66 and ensures its positioning on top of roller 55 for alignment with the female member. The boss 74 on arm 7, on which roller 73 is carried is slanted to the vertical to comport with the still slanted condition of side 61 respecting the vertical, and slanted to the longitudinal extent of the machine due to the slant of side 61 in that direction also.

Figure 6:
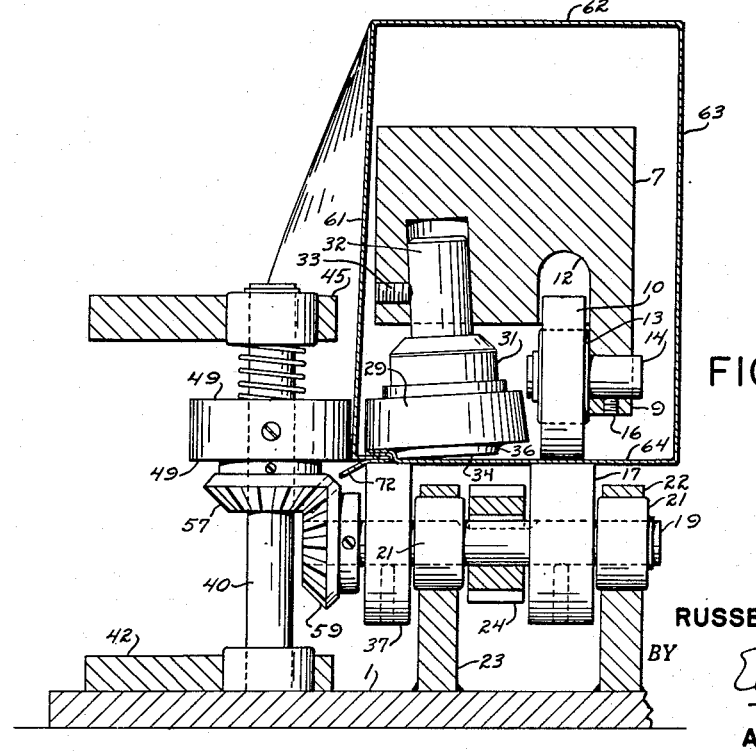

At the stage of Fig. 6, the flange 66 is partly inserted into the female element 69, 70 by roller 49 which is located inwardly of roller 48 in accordance with the slant of side 46 of top plate 45. Since horizontal guidance for flange 66 is now provided in the female element, which is, itself, suitably guided, a horizontal roller on shaft 19 adjacent shaft 40 is unnecessary and, instead, the driven bevel gear 59 is provided.

Figure 7:
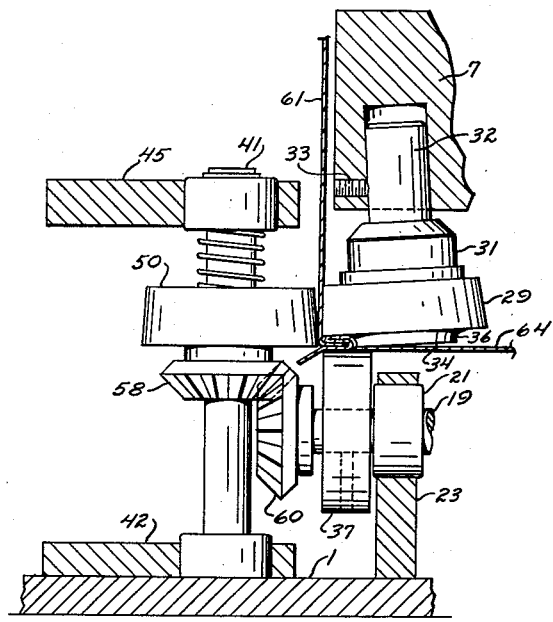

In Fig. 7 the flange 66 is into fully inserted position in the fold 69, 70. As seen in Fig. 1, the axes of shafts 40 and 41 are equidistant from the faces of the respective rollers 29 and the final shift of flange 66 is achieved by an increase in diameter of roller 50 over that of roller 49. This increase appears only at the bottom of roller 50, which is beveled on its peripheral face, the purpose being to give point contact with the work for accurate placement in the final movement of insertion.

Figure 8:
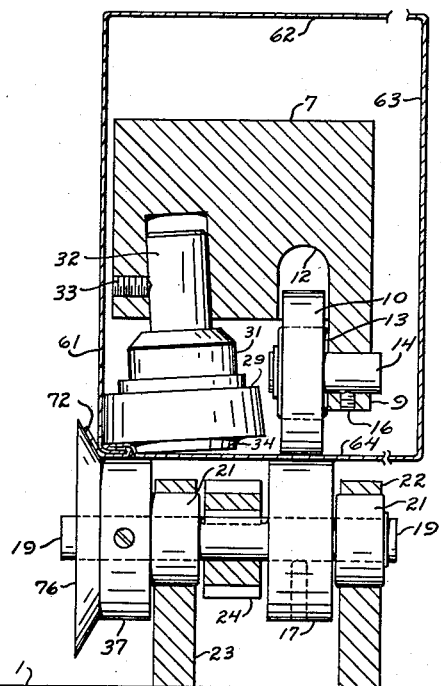

In Fig. 8, the upward folding of extension 72 is initiated by a beveled roller 76, carried on shaft 19 and which may be integral with roller 37 or keyed to shaft 19.

Figure 9:
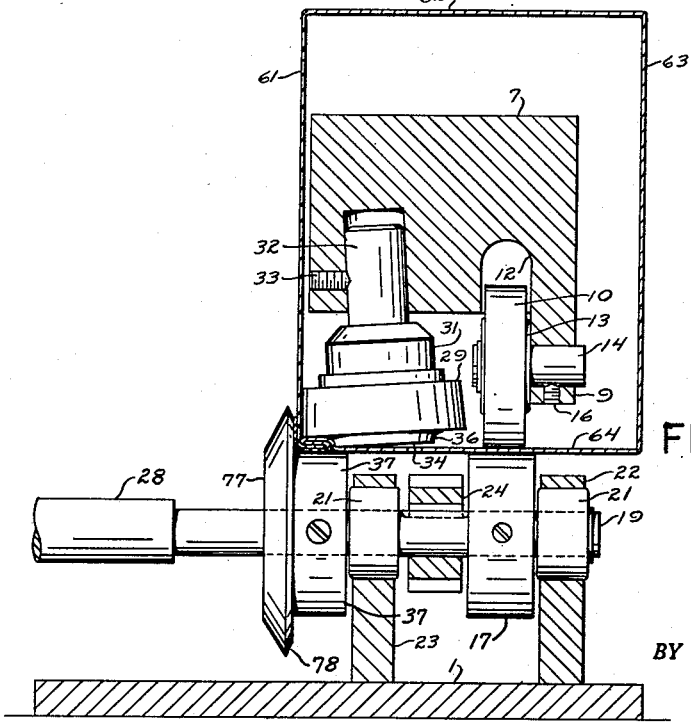

In Fig. 9, the upturning of extension 72 into right-angular form is completed to contact face 61 of the work by means of a roller 77 mounted for rotation with rollers 37 and 17. Roller 77 is beveled as at 78 on its inner peripheral edge at an angle corresponding approximately to the inclination of extension 72 achieved in the preceding stage so that abrupt, sharp-edged contact is avoided.

Figure 10:
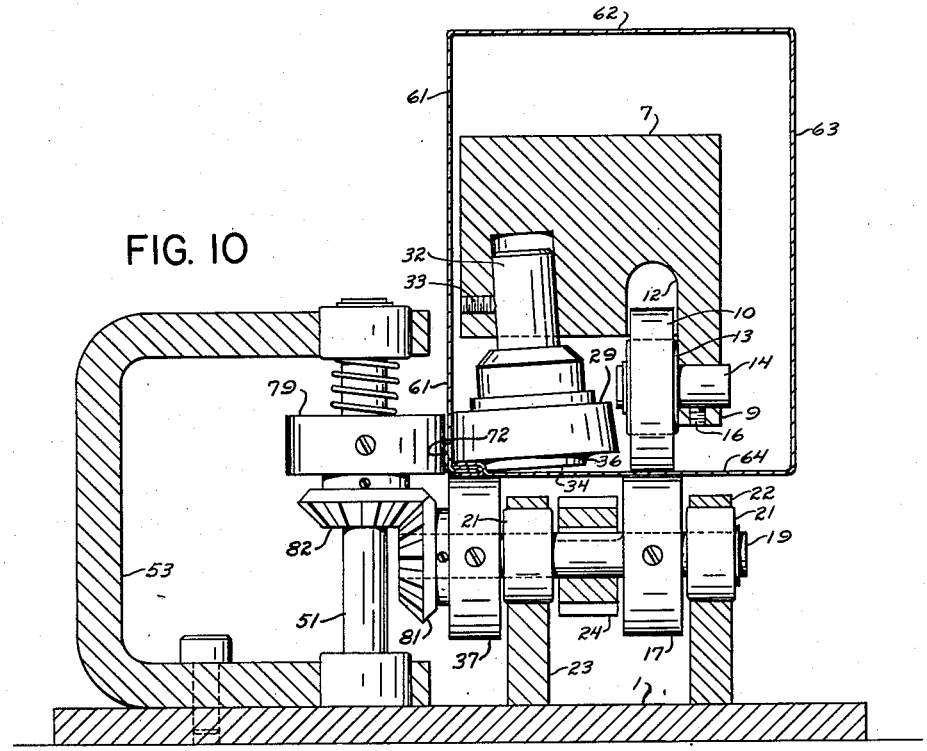

Fig. 10 shows the final operation, wherein roller 79, mounted on shaft 51 and driven by bevel gears 81, 82, tightly engages extension 72 to roll it into close adherence with side 61 of the work. Thus, collectively and in mutual coaction, rollers 29, 37 and 79 all conspire to give a final, secure and smooth seal to the lock.

Thus, it will be seen that a machine has been provided which achieves in a continuous fashion the jointure, positive interengagement, and smooth and secure final sealing of seam elements while achieving speed and economy of manufacture. While a certain preferred embodiment has been shown, the invention is not limited thereby and various changes in the size, shape and arrangement, for instance, of the various elements may be made without, however, departing from the spirit or scope of the appended claims.

What is claimed is:

1. In a sealing machine for corner seams in rectangular tubing, a base, an upright, a cantilever arm carried by said upright, a first series of rollers spaced lengthwise of said arm, depending from said arm and rotatable on axes generally perpendicular to said base, a second series of rollers carried by said base, rotatable on axes generally parallel to said base, each adjacent the underside of a roller of said first series and located near the periphery thereof, drive means serially connecting the rollers of said second series and arranged for unidirectional rotation thereof, and a third series of rollers mounted for rotation on axes generally perpendicular to said base and located outwardly of said cantilever arm along one side thereof and generally coplanar with the rollers of said first series, the rollers of said third series being spaced from said cantilever arm by an amount which decreases stepwise along the length of said cantilever arm away from said upright.

2. In a sealing machine for corner seams in rectangular tubing, a base, an upright, a cantilever arm carried by said upright, a first series of rollers spaced lengthwise of said arm, depending from said arm and rotatable on axes generally perpendicular to said base, a second series of rollers carried by said base, rotatable on axes generally parallel to said base, each adjacent the underside of a roller of said first series and located near the periphery thereof, drive means serially connecting the rollers of said second series and arranged for unidirectional rotation thereof, a third series of rollers mounted for rotation on axes generally perpendicular to said base and located outwardly of said cantilever arm along one side thereof and generally co-planar with the rollers of said first series, and drive means between said second series of rollers and said third series of rollers, the rollers of said third series being spaced from said cantilever arm by an amount which decreases stepwise along the length of said cantilever arm away from said upright.

3. In a sealing machine for corner seams in rectangular tubing, a base, an upright, a cantilever arm carried by said upright, a first series of rollers spaced lengthwise of said arm, depending from said arm and rotatable on axes generally perpendicular to said base, a second series of rollers carried by said base, rotatable on axes generally parallel to said base, each adjacent the underside of a roller of said first series and located near the periphery thereof, drive means serially connecting the rollers of said second series and arranged for uni-directional rotation thereof, and a third series of rollers mounted for rotation on axes generally perpendicular to said base and located outwardly of said cantilever arm along one side thereof and generally co-planar with the rollers of said first series, the rollers of said third series being spaced from said cantilever arm by an amount which decreases stepwise along the length of said cantilever arm away from said upright, the roller of said third series closest to said cantilever arm having a tapered, peripheral edge, with its lower face having a diameter greater than its upper face.

4. In a sealing machine for corner seams in rectangular tubing, a base, an upright, a cantilever arm carried by said upright, a first series of rollers spaced lengthwise of said arm, depending from said arm and rotatable on axes generally perpendicular to said base, a second series of rollers carried by said base, rotatable on axes generally parallel to said base, each adjacent the underside of a roller of said first series and located near the periphery thereof, drive means serially connecting the rollers of said second series and arranged for uni-directional rotation thereof, a third series of rollers mounted for rotation on axes generally perpendicular to said base and located outwardly of said cantilever arm along one side thereof and generally co-planar with the rollers of said first series, and drive means between said second series of rollers and said third series of rollers, the rollers of said third series being spaced from said cantilever arm by an amount which decreases stepwise along the length of said cantilever arm away from said upright, the final rollers of said second series having, co-axially mounted therewith, rollers overlapping the peripheries of the respective co-acting rollers of said first series.

5. A machine as in claim 4, one of said overlapping rollers having a beveled edge diverging from the periphery of the adjacent roller of said first series, and another of said overlapping rollers having a flat face adjacent and parallel to the periphery of the adjacent roller of said first series.

6. A machine as in claim 1, wherein the axes of the rollers of said first series are inclined at a slight angle to the axes of the rollers of both said second and third series.

7. In a machine for closing corner seams in rectangular tubing, the sub-combination of a base supporting a first series of aligned roller means, an upright member on the base supporting a cantilever arm having a second series of roller means aligned with the first-mentioned roller means and countradisposed thereto in tangential relation, whereby a wall of said tubing is receivable between said respective series of roller means to be driven thereby, and a third series of roller means disposed outwardly of a side of said cantilever arm on axes perpendicular to the plane of tangency of said first and second series of roller means, with peripheral surfaces arranged to contact the outside face of a wall of said tubing angularly disposed to the first-mentioned wall, the said surfaces of said third series being disposed at successively decreasing distances from said cantilever arm with increasing distance from said upright member to progressively move said angularly disposed wall toward said first-mentioned wall.

8. In a machine for closing corner seams in rectangular tubing the sub-combination of an aligned series of roller means with roller elements contradisposed in tangential relation to receive a wall of the tubing therebetween, to drive the same, and a second series of roller means disposed laterally of the first-mentioned series, on axes perpendicular to the plane of tangency of said aligned series of roller means, with peripheral surfaces arranged to contact the outer face of a free-edged wall of said tubing angularly disposed to the first-mentioned wall, the said surfaces of said second series being disposed at successively decreasing distances from said aligned series, and a third series of roller means also disposed laterally of the first-mentioned series and with their upper portions substantially coplanar with the plane of tangency of said first-mentioned series, and contacting the lower face of said free-edged wall to support the latter while it is free.

9. In a machine for sealing tubing of polygonal section having a corner seam with elements on adjacent edges of angularly disposed meeting walls to be locked together, the sub-combination of a base, an upright member on the base, a cantilever arm on the upright member, roller means on the base and on the said arm arranged in substantially tangential relation, and in series on one side of said upright and adapted to receive between them one of said elements, to drive said tubing, roller means arranged in series along and to one side of the first-mentioned roller means, and adapted to contact the outer surface of the wall having the other of said elements, said latter roller means located at decreasing distances from said cantilever arm with increasing distance from said upright member, and means to deflect the outer portion of said one of said elements downwardly away from the plane of the latter at a position near the commencement of the second-mentioned roller means to prepare said one of said elements for proper initial engagement by the other of said elements.

10. In a machine for sealing tubing of polygonal section having a corner seam with elements on adjacent edges of angularly disposed meeting walls to be locked together, the sub-combination of a base, an upright member on the base, a cantilever arm on the upright member, roller means on the base and on the said arm arranged in substantially tangential relation, and in series on one side of said upright and adapted to receive between them one of said elements, to drive said tubing, roller means arranged in series along and to one side of the first-mentioned roller means, and adapted to contact the outer surface of the wall having the other of said elements, said latter roller means located at decreasing distances from said cantilever arm with increasing distance from said upright member, means to deflect the outer portion of said one of said elements downwardly away from the plane of the latter at a position near the commencement of the second-mentioned roller means to prepare said one of said elements for proper initial engagement by the other of said elements, and guide rollers engaging both faces of said other of said elements, and locating the same substantially aligned with the said one of said elements.

11. In a machine for sealing tubing of polygonal section having a corner seam with elements on adjacent edges of angularly disposed meeting walls to be locked together, the sub-combination of a base, an upright member on the base, a cantilever arm on the upright member, roller means on the base and on the said arm arranged in substantially tangential relation, and in series on one side of said upright and adapted to receive between them one of said elements, to drive said tubing, and roller means arranged in series along and to one side of the first-mentioned roller means, and adapted to contact the outer surface of the wall having the other of said elements, said latter roller means located at decreasing distances from said cantilever arm with increasing distance from said upright member, the last one of said second-mentioned roller means closely adjacent the first-mentioned roller means comprising a roller with beveled periphery with major diameter on its lower side to insure proper initial engagement of said elements.

12. In a machine for sealing progressively moving tubing of polygonal section having a corner seam with a female element at one edge of a wall and aligned therewith, and a male element at one edge of, and angularly disposed to, a meeting wall, the sub-combination of means for continuously contacting the inner and outer faces of said female element as the tubing progresses, guide means for said meeting wall arranged in angular relation to the first mentioned means whereby to cam the said male element progressively toward and into said female element, support means for the outer side of said male element in its progress along said guide means, to retain said male element aligned with said female element, and means contacting the inner side of said male element in opposed relation to at least one of said support means.

13. In a machine for sealing progressively moving tubing of polygonal section having a corner seam with a female element at one edge of a wall and aligned therewith, and a male element at one edge of, and angularly disposed to, a meeting wall, the sub-combination of means for continuously contacting the inner and outer faces of said female element as the tubing progresses, guide means for said meeting wall arranged in angular relation to the first mentioned means whereby to cam the said male element progressively toward and into said female element, support means for the outer side of said male element in its progress along said guide means, to retain said male element aligned with said female element, means contacting the inner side of said male element in opposed relation to at least one of said support means, and means to deflect downwardly the outer edge of said female member, and located in advance of the means contacting the inner side of said male element.

14. In a machine for sealing progressively moving tubing of polygonal section having a corner seam with a female element at one edge of a wall and aligned therewith, and a male element at one edge of, and angularly disposed to, a meeting wall, the combination of means for continuously contacting the inner and outer faces of said female element as the tubing progresses, guide means for said meeting wall arranged in angular relation to the first mentioned means whereby to cam the said male element progressively toward and into said female element, support means for the outer side of said male element in its progress along said guide means, to retain said male element aligned with said female element, means contacting the inner side of said male element in opposed relation to at least one of said support means, means to deflect downwardly the outer edge of said female member, and located in advance of the means contacting the inner side of said male element, and means interposed in the path of advance of said outer edge of said female element to fold the latter into contacting relation with the outer surface of said meeting wall subsequent to full jointure of said male and female elements.

15. In a machine for sealing progressively moving tubing of polygonal section having a corner seam with a female element at one edge of a wall and aligned therewith, and a male element at one edge of, and angularly disposed to, a meeting wall, the combination of means for continuously contacting the inner and outer faces of said female element as the tubing progresses, guide means for said meeting wall arranged in angular relation to the first mentioned means whereby to cam the said male element progressively toward and into said female element, support means for the outer side of said male element in its progress along said guide means, to retain said male element aligned with said female element, means contacting the inner side of said male element in opposed relation to at least one of said support means, means to deflect downwardly the outer edge of said female member, and located in advance of the means contacting the inner side of said male element, and means interposed in the path of advance of said outer edge of said female element to fold the latter into contacting relation with the outer surface of said meeting wall subsequent to full jointure of said male and female elements, said latter means comprising a first roller having a beveled periphery providing an initial contact with said outer edge of said female element, to initiate the folding thereof, and a second roller located in following sequence to said first roller and contacting said outer edge of said female member with a flat, side face perpendicular to the roller axis, whereby to complete the folding of said outer edge.

16. In a machine for sealing progressively moving tubing of polygonal section having a wall with a free edge folded into a female element of generally S-form, and a meeting wall with a free edge angularly disposed to provide a male element, the combination of a base, an upright, a cantilever arm extending from the upright, a first series of roller means on the cantilever arm, a second series of roller means on the base contradisposed to the first roller means in tangential relation for accommodating said female element and driving the tubing, a third series of rollers arranged alongside said cantilever arm adjacent said contradisposed series of rollers and adapted to contact the outer face of said meeting wall and arranged at decreasing distances from said contradisposed series of rollers with increasing distance from said upright to gradually urge said meeting wall toward said female element, a series of guide rollers arranged to support said male element in alignment with said female element, roller means having a periphery arranged at an angle and located in the path of advance of an extending edge of said female element to deflect it downwardly prior to jointure of said elements, and roller means having angularly arranged contacting surfaces also located in the path of advance of said extending edge, whereby to fold said edge upwardly into contact with said outer face of said meeting wall after jointure of said elements.

17. In a machine for sealing progressively moving tubing of polygonal section having a wall with a free edge folded into a female element of generally S-form, and a meeting wall with a free edge angularly disposed to provide a male element, the combination of a base, an upright, a cantilever arm extending from the upright, a first series of roller means on the cantilever arm, a second series of roller means on the base contradisposed to the first roller means in tangential relation for accommodating said female element and driving the tubing, a third series of rollers arranged alongside said cantilever arm adjacent said contradisposed series of rollers and adapted to contact the outer face of said meeting wall and arranged at decreasing distances from said contradisposed series of rollers with increasing distance from said upright to gradually urge said meeting wall toward said female element, a series of guide rollers arranged to support said male element in alignment with said female element, roller means having a periphery arranged at an angle and located in the path of advance of an extending edge of said female element to deflect it downwardly prior to jointure of said elements, and roller means having angularly arranged contacting surfaces also located in the path of advance of said extending edge, whereby to fold said edge upwardly into contact with said outer face of said meeting wall after jointure of said elements, said last-mentioned means comprising a first roller with beveled periphery extending beyond the plane of said first-mentioned wall, and a second roller with a flat, side face extending beyond the plane of said first mentioned wall and perpendicular thereto.

References Cited in the file of this patent

UNITED STATES PATENTS

| Number | Name | Date |
|---|---|---|
| 495,426 | Murch | Apr. 11, 1893 |
| 592,767 | Einfeldt | Nov. 2, 1897 |
| 841,838 | Williams | Jan. 22, 1907 |
| 1,475,399 | Kronquist | Nov. 27, 1923 |
| 1,596,862 | Aikens | Aug. 24, 1926 |
| 1,673,787 | Frahm | June 12, 1928 |
| 1,763,797 | Magee | June 17, 1930 |
| 1,770,963 | Yoder | July 22, 1930 |
| 2,025,750 | Ingels | Dec. 31, 1935 |
| 2,027,215 | Williams | Jan. 7, 1936 |
| 2,042,250 | Engelman | May 26, 1936 |
| 2,251,967 | Yoder | Aug. 12, 1941 |
| 2,563,805 | Adamson | Aug. 14, 1951 |